Aug. 21, 1956 P. A. SULLIVAN 2,760,165

TEMPERATURE-CONTROLLED TIME-DELAY SIGNAL-TRANSLATING DEVICE

Filed Oct. 1, 1952

INVENTOR.
PAUL A. SULLIVAN

BY Lawrence B. Dodds

ATTORNEY

United States Patent Office 2,760,165

Patented Aug. 21, 1956

2,760,165

TEMPERATURE-CONTROLLED TIME-DELAY SIGNAL-TRANSLATING DEVICE

Paul A. Sullivan, West Roxbury, Mass., assignor to Hazeltine Research, Inc., Chicago, Ill., a corporation of Illinois Application October 1, 1952, Serial No. 312,620

16 Claims. (Cl. 333—30)

GENERAL

Figures 1, 2:
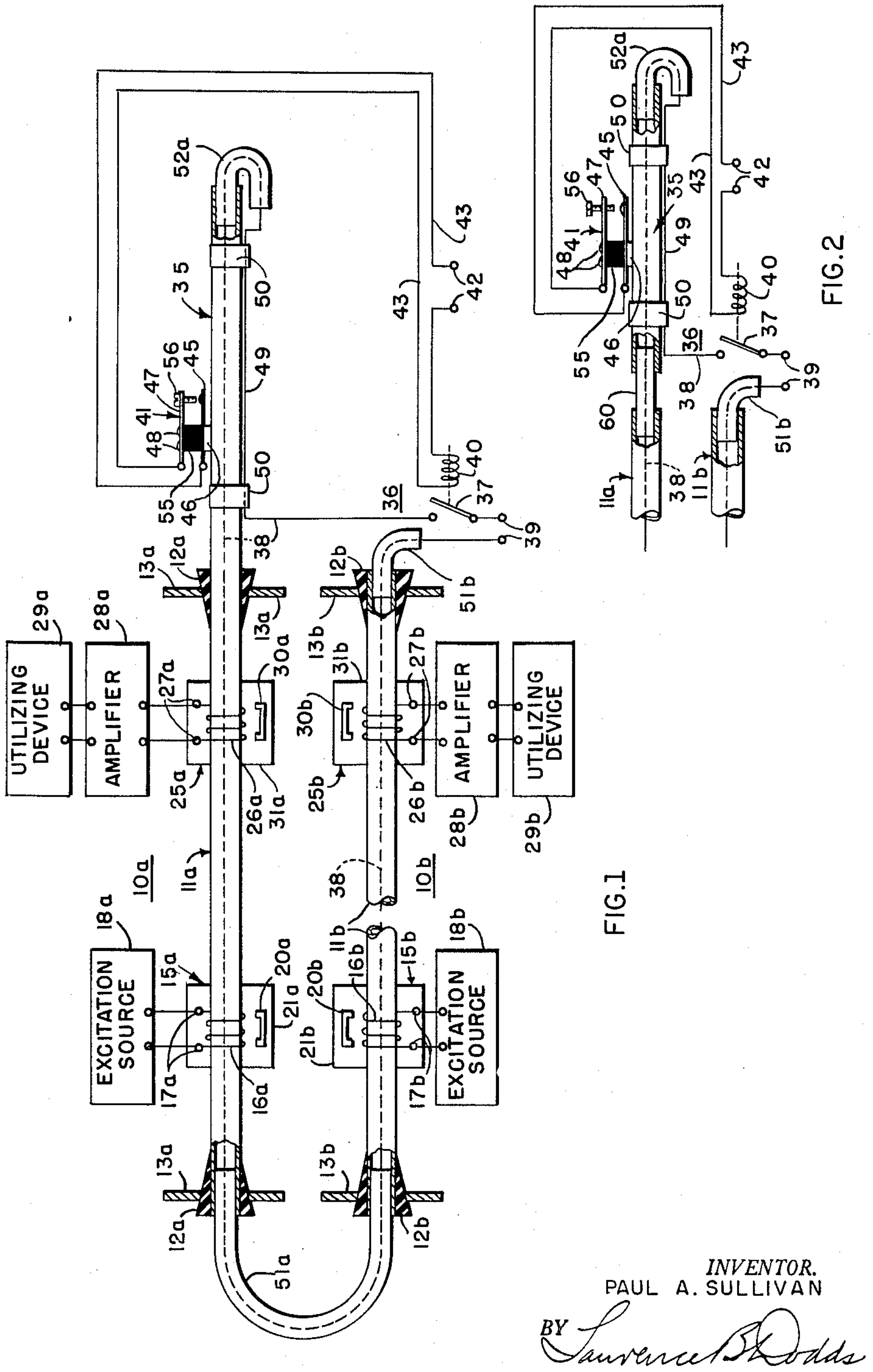

This invention relates to temperature-controlled time-delay signal-translating devices. Although the invention is useful in connection with a variety of time-delay signal-translating devices, such as those employing distributed or continuous windings on an elongated core and also those which convert an electrical signal to a stress wave and vice versa, as a magnetostrictive or electrostrictive time-delay apparatus, it has particular utility with reference to magnetostrictive time-delay signal-translating devices. Accordingly, the invention will be described in that environment.

Magnetostrictive time-delay signal-translating devices are rather widely employed to translate applied signals having a variety of wave forms, such signals including sinusoidal signals and especially pulse signals, and the time delays afforded thereto may be of the order of 150 microseconds. For some applications, electrical equipments using such time-delay devices are required to provide output pulses which are delayed with respect to the applied input pulses over an extremely wide range of ambient temperatures, for example, over a temperature range of from about —18° F. to +180° F. In addition, these delay devices are often required to be accurate within 0.25 microsecond of the exact delay.

In order to achieve such results, attempts have been made to maintain the operating temperature of the time-delay signal-translating device relatively constant, so that expansion and contraction of the magnetostrictive material caused by temperature effects is reduced, thereby affording translation of the applied signal with a rather accurate time delay. This operating temperature ordinarily corresponds to the maximum expected operating temperature of the device. Heretofore, signal-translating devices of the type under consideration have been operated in temperture-controlled electrically heated ovens in an endeavor to secure the required accuracy and temperature stability. Such operation presents a number of practical difficulties and, additionally, is not effective to provide pulse-translation accuray within the desired limits.

The insulated thermostatically controlled ovens for prior such devices are extremely bulky and, hence, are undesirable for most applications, particularly those wherein available space is limited. Furthermore, the power necessary to operate the electrical heater or heaters is great, some devices requiring approximately 1,000 watts of energy. Obviously, such a power requirement is excessive for many applications such as in airborne installations wherein the available electrical power is usually quite limited. Sometimes an adjustment of the magnetostrictive time-delay signal-translating device is necessary during its operation, thus necessitating that the oven be opened for at least a brief interval. This, in turn, produced a loss in heat, and when the oven was closed, the time required for it to regain its normal operating temperature was considerable, sometimes requiring as much as one hour. In addition to having a long warm-up time, these ovens tended to heat the time-delay signal-translating device unevenly, the top of the device being hotter than the lower portion thereof and the temperature was uneven along its length. This non-uniformity in operating temperature tended to impair the accuracy of the device.

It is an object of the invention, therefore, to provide a new and improved temperature-controlled time-delay signal-translating device which avoids one or more of the above-mentioned disadvantages and limitations of prior such devices.

It is another object of the invention to provide a new and improved temperature-controlled time-delay signal-translating device which is capable of operating satisfactorily over a wide range of ambient temperatures.

It is a further object of the invention to provide a new and improved temperature-controlled time-delay signal-translating device which has good temperature stability, is simple in construction, relatively inexpensive to manufacture and is economical of power.

It is a still further object of the invention to provide a new and improved temperature-controlled time-delay signal-translating device which has a quick warm-up time and may be adjusted to obtain various time delays during operation.

It is an additional object of the invention to provide a new and improved temperature-controlled time-delay signal-translating device which is light in weight and affords good electrical performance.

In accordance with a particular form of the invention, a temperature-controlled time-delay signal-translating device comprises an elongated hollow electric-signal delay element and an input means for that element including electrical signal input terminals for an applied electrical signal. The time-delay signal-translating device also includes an output means for the delay element spaced from the input means for deriving an output signal delayed relative to the applied signal, and a monitor hollow section mechanically coupled to the delay element and projecting exteriorly of one of the aforesaid input and output means and having a temperature-response characteristic substantially corresponding to that of the delay element. The temperature-controlled time-delay signal-translating device further includes a heater system including a heater element extending through the delay element and the aforesaid section and including a thermostatic control element in the immediate vicinity of the monitor section and responsive to the temperature of that section for controlling the energization of the heater system.

For a better understanding of the present invention, together with other and further objects thereof, reference is had to the following description taken in connection with the accompanying drawing, and its scope will be pointed out in the appended claims.

Referring now to the drawing:

Fig. 1 is a diagrammatic representation, partly schematic, of a temperature-controlled time-delay signal-translating device in accordance with a particular form of the present invention, and Fig. 2 is a similar representation of a portion of a temperature-controlled time-delay signal-translating device in a modified form of the invention.

*Description of time-delay signal-translating device of Fig. 1*

Referring now more particularly to Fig. 1 of the drawing, there is represented a pair of temperature-controlled time-delay signal-translating devices 10*a* and 10*b* of substantially identical construction. Accordingly, corresponding components of the former are identified by reference numerals with the subscript *a* and those of the latter by the same reference numerals with the subscript *b*. A detailed description of one of the devices will suffice for the other. The signal-translating device 10*a* comprises an elongated hollow electrical signal-delay element 11*a*, preferably of electrical conductive material such as nickel or a nickel-iron alloy exhibiting strong stress-wave propagating or magnetostrictive properties. In a preferred form, the delay element 11*a* comprises a hollow cylindrical core of substantially pure nickel having a shiny outer surface.

The signal-translating device 10*a* is provided with tapered members 12*a*, 12*a* secured to the exterior of the core adjacent the ends thereof. These members are of a suitable sound-absorbing material and may comprise tape wound about the core to provide a reduction in undesired reflection effects. The members 12*a*, 12*a* may also facilitate mounting the cores in a manner well known in the art, as by suitable mounting supports 13*a*, 13*a* which are represented diagrammatically in the drawing. The time-delay device 10*a* also includes an input means or transducer 15*a* for the element 11*a*, including an excitation winding 16*a* encircling and magnetically coupled with a first portion of the time-delay element 11*a* and including electrical signal input terminals 17*a*, 17*a* for an applied electrical signal, for converting that signal to a stress wave in the time-delay element. The excitation winding 16*a* may be resonant at a frequency corresponding to a period approximately equal to, or of the order of, twice the duration of the signal pulse to be translated. An excitation source 18*a*, which may comprise a conventional electronic pulse generator, is coupled to the terminals 17*a*, 17*a* for supplying a pulse of excitation current to the winding 16*a*. The transducer 15*a* includes suitable means for establishing a polarizing magnetic flux in the portion of the time-delay element 11*a* encircled by the winding 16*a*. This means may comprise the winding 16*a* which is responsive to the anode output current of the source 18*a* or may comprise a permanent magnet 20*a*. The latter is diagrammatically represented in the drawing and is associated with that portion of the magnetostrictive core which is influenced by the winding 16*a*. The transducer 15*a* is preferably enclosed in a metallic container 21*a* for shielding external circuits and other components of the time-delay device 10*a* from the influence of winding 16*a*.

The temperature-controlled time-delay signal-translating device 10*a* further includes an output means or transducer 25*a*, including an inductive winding 26*a* encircling and magnetically coupled with a second portion of the time-delay element 11*a*. This transducer is either fixed or adjustably spaced from the transducer 15*a* and is responsive to a stress wave developed in element 11*a* by unit 15*a* for deriving an output electrical signal delayed with respect to the signal or pulse applied to the terminals 17*a*, 17*a*. The transducer 25*a* is generally similar in construction to the unit 15*a* and includes a pair of output terminals 27*a*, 27*a* for the winding 26*a*, a shield container 31*a* which may be omitted for some applications of the device 10*a*, and suitable means for establishing the polarized magnetic flux necessary to assure good magnetostrictive conversion. This last-mentioned means may comprise the winding 26*a* and the input circuit of a conventional amplifier 28*a* coupled to the output terminals 27*a*, 27*a*, but preferably comprises a permanent magnet 30*a*. The induction winding 26*a* may also be resonant at a frequency corresponding to the period approximately equal to, or of the order of, twice the duration of the pulse applied to the input terminals 17*a*, 17*a* of unit 15*a*. A utilizing device 29*a*, which may include a suitable indicator for indicating or displaying the delayed output pulses of the device 10*a*, is coupled to the output circuit of the amplifier 28*a*.

For some applications wherein a plurality of output pulses having different time delays with respect to the applied input pulse are desired, additional output transducers and associated amplifiers and utilizing devices such as the units 25*a*, 28*a*, and 29*a* may be employed. To simplify the representation, however, only one such output system has been shown.

The time-delay signal-translating device 10*a* further includes a monitor hollow section 35 positioned in the immediate vicinity of the element 11*a* and having a temperature-response characteristic substantially corresponding to that of the aforesaid element. This monitor section may conveniently comprise an extension of the nickel core of element 11*a*, the extension being disposed beyond a tapered member 12*a* so that it is effectively beyond the influence of the stress wave developed in the core and, hence, unlikely to influence the active magnetostrictive portion between the transducers 15*a* and 25*a*. The device 10*a* also includes an electrical heater system 36 comprising a first portion including a switch 37 and a heater element 38 in the form of an insulated heat-generating wire extending through the delay elements 11*a* and 11*b* and also through the monitor section 35. The heater element is preferably a flexible wire and is insulated with a material such as Fiberglas for withstanding rather high operating temperature. A pair of terminals 39, 39 supply suitable energy to the element 38 through the switch 37 as from a 230-volt alternating-current source. The heater system also comprises a second portion including a relay winding 40 for controlling the switch 37 and includes a thermostatic control element 41 in the immediate vicinity of the monitor section and connected to the winding 40 and responsive to the temperature of the monitor section 35 for controlling the energization of the heater system. This second portion includes a pair of input terminals 42, 42 connected by conductors 43, 43 to the relay winding 40 and to the thermostatic control element 41. The latter includes a bimetallic member 45 of low mass preferably conductively connected to the monitor section 35 as by a small metallic block 46 soldered to the section 35. A relatively rigid conductive member 47 is secured in insulated relation to the block 46 and the bimetallic member 45 by a pair of screws 48, 48, a block 55 of insulating material such as lava having a very low heat-transfer characteristic being employed to separate the members 45 and 47. Member 47 is provided with a small diameter metallic-adjusting screw 56 having a platinum contact tip for making intermittent engagement with a corresponding contact tip on the bimetallic member 45. The heater element 38 preferably has a portion 49 folded back along the outside of the monitor section 35 and suitably secured thereto as by a length of tape 50.

The signal-translating device 10*a* additionally includes a sleeve 51*a* of heat-insulating material interposed in one end of the delay element 11*a* and a similar sleeve 52*a* in the free end of the hollow monitor section 35 between the inner wall of the nickel core and corresponding portions of the outer surface of the heater element 38. The sleeve 51*a* constitutes a loop which extends into the delay element 11*b*. These sleeves extend about one-half inch into the hollow core and tend to seal the ends thereof.

*Operation of time-delay signal-translating device of Fig. 1*

In considering the operation of the temperature-controlled time-delay signal-translating device of Fig. 1, it will be assumed initially that the heater element 38 has been energized from the source connected to the terminals 39, 39 for a sufficient length of time to bring the temperature of the device to at least the maximum expected ambient temperature or to a temperature which is slightly higher. With the temperature of the time-delay signal-translating device stabilized as just mentioned, a signal of pulse wave form is applied to the input terminals 17*a*, 17*a* of the transducer 15*a* by the source 18*a*. The flow of exciting current through the winding 16*a* varies the magnetic flux in the portion of the delay element 11*a* associated with the winding and establishes in that portion a longitudinal mechanical stress such as a contraction. This stress creates two similar longitudinal stress waves or mechanical wave pulses which travel in opposite directions along the longitudinal axis of the delay element **11*a*** at the velocity of stress-wave propagation exhibited by the magnetostrictive material of the device. This velocity may be of the order of 4500 meters per second.

The stress wave traveling in the direction of the tapered sound-absorbing member **12*a* nearest the transducer 15*a* is effectively suppressed thereat and is not employed. The stress wave traveling in the direction of the induction winding 26*a* of the transducer 25*a* is the useful one and arrives in the portion of the delay element 11*a* under the winding 26*a* at a time determined by the distance between the transducers 15*a* and 25*a* and the velocity of propagation in the magnetostrictive material. This time determines the delay of the response of the induction winding 26*a* to the pulse of exciting current applied to the excitation winding 16*a*. It is found that the value of the velocity of propagation mentioned above results in convenient dimensions of the signal-translating device 10*a*** for pulse widths of the order of 5 microseconds and for time delays of the order of 10–200 microseconds.

As the stress wave enters the portion of the delay element **11*a* beneath the winding 26*a*, the permeability of that portion is modified and the flux established therein by the polarizing means or magnet 30*a* is changed. This change in flux induces a signal or pulse in the induction winding 26*a* which is translated by the output terminals 27*a*, 27*a* to the amplifier 28*a* wherein it is amplified and applied to the utilizing device 29*a* which may provide a suitable indication. When the stress wave travels beyond the induction winding 26*a* to the tapered member 12*a* adjacent the monitor section 35, it is effectively suppressed by the tapered member. The signal-translating action of the signal-delay device 10*b* is similar to that of the device 10*a*** and, hence, need not be explained.

It will now be assumed that the operating temperature of the time-delay signal-translating devices **10*a* and 10*b* has decreased below the desired temperature. When this happens, the bimetallic member 45 of the thermostatic control element 41 is deflected so that its contact makes engagement with the contact screw 56 supported by the rigid member 47. This completes a circuit through the relay winding 40 to the source connected to the terminals 42, 42, and the switch 37 is thereupon moved to its closed position wherein it is effective to permit the application of energy to the heater element 38 extending through the hollow delay elements 11*a* and 11*b* and also the monitor section 35. Current flow in the heater element 38 raises the temperature of the hollow members uniformly in a short interval of time until the delay elements 11*a* and 11*b* reach the correct operating temperature. At this time the free end of the bimetallic member 45 returns to its original position whereupon its contact with the screw 56 is disengaged and the relay winding 40 is no longer energized. The switch 37 opens and the application of energy to the heater element 38 ceases. The contacts of the thermostatic control element remain disengaged so long as the monitor section 35 is at the correct operating temperature. Since the monitor section is an extension of the delay element 11*a* and, thus, effectively has the same temperature-response characteristic as that element, the thermostatic control element 41 is effective accurately to respond to the temperature of delay element 11*a* and its corresponding element 11*b*. When the temperature of the monitor section 35 and, hence, the elements 11*a* and 11*b* decreases, contact is again made between the member 45 and the screw 56 of member 47 so that the switch 37 is closed in the manner previously explained, thus reapplying current to the heater element 38 for raising the temperature of the delay elements. As the temperature of the elements 11*a* and 11*b*** varies, the described operations of the heater system are repeated, thereby accurately controlling the temperature of the time-delay signal-translating devices.

Since the bimetallic member 45 has a small mass with relation to that of the monitor section 35, it requires but very little heat to increase its temperature and this occurs only when contact is made with the screw 56. The screw 56 has a small diameter so that it is capable of transmitting to the rigid contact member 47 of the thermostatic control element but a small amount of heat when the relay winding 40 is energized. Accordingly, the monitor section 35 and the thermostatic control element have a thermal response characteristic which is substantially the same as that of either of the delay elements. In order to compensate for any slight difference in the thermal response characteristic of the monitor section 35 from that of the signal-delay element **11*a* for example, the portion 49 of heater element 38 which is folded back along the outside of the monitor section imparts additional heat to that section and to the thermostatic control element 41 during the heating portion of the operating cycle. Thus, the monitor section and its associated components effectively has a temperature-response characteristic which is identical with that of the delay elements 11*a* and 11*b***. The shiny exterior surface of those elements tends to reduce the amount of heat which can be radiated to the surrounding air.

It has been determined experimentally that the presence of a flexible heater element 38 within the active portions of the delay elements **11*a* and 11*b*** has no significant or detrimental effect on the signal-translating characteristics thereof. Apparently its flexible construction prevents it from interfering with the propagation of stress waves in magnetostrictive material.

The sleeves of insulating material **51*a*, 52*a*, and 51*b* which are inserted in the ends of the cores are effective to maintain the temperature near the ends of those cores substantially the same as that of the portions intermediate those ends. Apparently the sleeves are effective to reduce the amount of heat escaping from the ends of the cores. In addition, the sleeves protect the insulation on the heater element 38 from abrasion by the sharp edges of the delay elements 11*a* and 11*b***.

In a temperature-controlled time-delay signal-translating device constructed in accordance with the Fig. 1 embodiment of the invention and employing as the magnetostrictive elements nickel tubing having about 99 per cent purity, an outside diameter of 0.195 inch and a thickness of 0.0035 inch, a nickel-iron flexible heater element inside of the tubing, a 230-volt alternating-current excitation source for the heater element, and a 6.3-volt alternating-current source controlling the relay winding, it is possible to hold the operating temperature within ±5.5° F. over an ambient temperature range of from −18° F. to +180° F., and for a 200-microsecond time delay afforded by the device the delay is accurate to ±0.25 microsecond. The device required a warm-up time of but 5 minutes, the power consumption was only 70 watts, and adjustment of the device to obtain various time delays was possible while the predetermined operating temperature was being maintained. The length of the element **11*a* was about 13½ inches, that of the monitor section 35 about 7½ inches, and that of the section 11*b*** about 24 inches so that time delays to 5-microsecond duration pulses of from 14–200 microseconds could be realized.

*Description of time-delay signal-translating device of Fig. 2*

Referring now to Fig. 2 of the drawing, there is represented a portion of a time-delay signal-translating device which is generally similar to that represented in Fig. 1, corresponding elements in both figures being identified with the same reference characters. The Fig. 2 device differs only from that of Fig. 1 in that the monitor hollow section 35 is not an integral extension of the signal-delay element **11*a*, but rather is connected thereto by means of a piece of insulating tubing 60 which projects a short distance into the adjacent ends of members 11*a* and 35**.

This tubing minimizes the flow of heat from the adjacent ends of the members 11*a* and 35 into the surrounding air and, thus, tends to keep the operating temperature of the adjoining ends of those members at the proper value. The operation of the time-delay signal-translating device of Fig. 2 is identical with that of the Fig. 1 device.

From the foregoing description, it will be seen that a temperature-controlled time-delay signal-translating device in accordance with the present invention does not require bulky temperature-controlled insulating chambers, is relatively simple in construction and economical of power, and can readily be adjusted for various time delays while the selected operating temperature is being maintained.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A temperature-controlled time-delay signal-translating device comprising: an elongated hollow electric-signal delay element; an input means for said element including electrical signal input terminals for an applied electrical signal; an output means for said delay element spaced from said input means for deriving an output signal delayed relative to said applied signal; a monitor hollow section mechanically coupled to said delay element and projecting exteriorly of one of said input and output means and having a temperature-response characteristic substantially corresponding to that of said delay element; and an electrical heater system including a heater element extending through said delay element and said section and including a thermostatic control element in the immediate vicinity of said section and responsive to the temperature of said section for controlling the energization of said heater system.

2. A temperature-controlled time-delay signal-translating device comprising: an elongated hollow electric-signal delay element; an input means for said element including electrical signal input terminals for an applied electrical signal; an output means for said delay element spaced from said input means for deriving an output signal delayed relative to said applied signal; a monitor hollow extension of said delay element projecting exteriorly of one of said input and output means and having a temperature-response characteristic substantially corresponding to that of said delay element; and an electrical heater system including a heater element extending through said delay element and said extension and including a thermostatic control element in the immediate vicinity of said extension and responsive to the temperature of said extension for controlling the energization of said heater system.

3. A temperature-controlled time-delay signal-translating device comprising: an elongated hollow electric-signal delay element of electrically conductive material having a shiny outer surface; an input means for said element including electrical signal input terminals for an applied electrical signal; an output means for said delay element spaced from said input means for deriving an output signal delayed relative to said applied signal; a monitor hollow section of said material having a shiny outer surface mechanically coupled to said delay element and projecting exteriorly of one of said input and output means and having a temperature-response characteristic substantially corresponding to that of said delay element; and an electrical heater system including a heater element extending through said delay element and said section and including a thermostatic control element in the immediate vicinity of said section and responsive to the temperature of said section for controlling the energization of said heater system.

4. A temperature-controlled time-delay signal-translating device comprising: an elongated hollow electric-signal delay element; an input means for said element including electrical signal input terminals for an applied electrical signal; an output means for said delay element spaced from said input means for deriving an output signal delayed relative to said applied signal; a monitor hollow section mechanically coupled to said delay element and projecting exteriorly of one of said input and output means and having a temperature-response characteristic susbtantially corresponding to that of said delay element; and an electrical heater system including a heater element extending through said delay element and said section and including a thermostatic control element of small mass conductively secured to said section and responsive to the temperature thereof for controlling the energization of said heater system.

5. A temperature-controlled time-delay signal-translating device comprising: an elongated hollow electric-signal delay element; an input means for said element including electrical signal input terminals for an applied electrical signal; an output means for said delay element spaced from said input means for deriving an output signal delayed relative to said applied signal; a monitor hollow section mechanically coupled to said delay element and projecting exteriorly of one of said input and output means and having a temperature-response characteristic substantially corresponding to that of said delay element; and an electrical heater system including a heater element extending through said delay element and said section and including a thermostatic control element having a bimetallic member conductively secured to said section and having a mass less than that of said section and responsive to the temperature thereof for controlling the energization of said heater system.

6. A temperature-controlled time-delay signal-translating device comprising: an elongated hollow electric-signal delay element; an input means for said element including electrical signal input terminals for an applied electrical signal; an output means for said delay element spaced from said input means for deriving an output signal delayed relative to said applied signal; a monitor hollow section mechanically coupled to said delay element and projecting exteriorly of one of said input and output means and having a temperature-response characteristic substantially corresponding to that of said delay element; and an electrical heater system including a heater element extending through said delay element and said section and folded back along the outside of said section and including a thermostatic control element in the immediate vicinity of said section and responsive to the temperature of said section for controlling the energization of said heater system.

7. A temperature-controlled time-delay signal-translating device comprising: an elongated hollow electric-signal delay element; an input means for said element including electrical signal input terminals for an applied electrical signal; an output means for said delay element spaced from said input means for deriving an output signal delayed relative to said applied signal; a monitor hollow section mechanically coupled to said delay element and projecting exteriorly of one of said input and output means and having a temperature-response characteristic substantially corresponding to that of said delay element; an electrical heater system including a heater element extending through said delay element and said section and including a thermostatic control element in the immediate vicinity of said section and responsive to the temperature of said section for controlling the energization of said heater system; and sleeves of heat-insulating material interposed in the ends of said delay element between the inner wall thereof and the adjoining portions of the outer surface of said heater element.

8. A temperature-controlled time-delay signal-translating device comprising: an elongated hollow electric-signal delay element; an input means for said element including electrical signal input terminals for an applied electrical signal; an output means for said delay element spaced from said input means for deriving an output signal delayed relative to said applied signal; a monitor hollow section mechanically coupled to said delay element and projecting exteriorly of one of said input and output means and having a temperature-response characteristic substantially corresponding to that of said delay element; and an electrical heater system comprising a first portion including a switch, a heater element extending through said delay element and said section, and comprising a second portion including a relay winding controlling said switch, and including a thermostatic control element in the immediate vicinity of said section and coupled to said winding and responsive to the temperature of said section for controlling the energization of said heater system.

9. A temperature-controlled time-delay signal-translating device comprising: an elongated hollow core; an input circuit on said core and including electrical signal input terminals for an applied electrical signal; an output circuit at a position on said core spaced from said input circuit for deriving an output signal delayed relative to said applied signal; a monitor hollow core section mechanically coupled to said core and projecting exteriorly of one of said input and output means and having a temperature-response characteristic substantially corresponding to that of said core; and an electrical heater system including a heater element extending through said core and said section and including a thermostatic control element in the immediate vicinity of said section and responsive to the temperature of said section for controlling the energization of said heater system.

10. A temperature-controlled time-delay signal-translating device comprising: an elongated hollow core of a predetermined material; an input circuit on said core and including electrical signal input terminals for an applied electrical signal; an output circuit at a position on said core adjustably spaced from said input circuit for deriving an output signal delayed relative to said applied signal; a monitor hollow section of said material mechanically coupled to said core and projecting exteriorly of one of said input and output means and having substantially the same diameter and thickness as that of said core; and an electrical heater system including a heater element extending through said core and said section and including a thermostatic control element in the immediate vicinity of said section and responsive to the temperature of said section for controlling the energization of said heater system.

11. A temperature-controlled time-delay signal-translating device comprising: an elongated hollow stress-wave propagating elements; an input transducer for said element including electrical signal input terminals for an applied electrical signal for converting said signal to a stress wave in said propagating element; an output transducer for said propagating element spaced from said input transducer and responsive to said stress wave for deriving an output electrical signal delayed relative to said applied signal; a monitor hollow section positioned in the immediate vicinity of said propagating element and having a temperature-response characteristic substantially corresponding to that of said propagating element; and an electrical heater system including a heater element extending through said propagating element and said section and including a thermostatic control element in the immediate vicinity of said section and responsive to the temperature of said section for controlling the energization of said heater system.

12. A temperature-controlled magnetostrictive time-delay signal-translating device comprising: an elongated hollow signal-delay element of magnetostrictive material; an input transducer for said delay element including electrical signal input terminals for an applied electrical signal for converting said signal to a stress wave in said delay element; an output transducer for said delay element spaced from said input transducer and responsive to said stress wave for deriving an output electrical signal delayed relative to said applied signal; a monitor hollow section positioned in the immediate vicinity of said delay element and having a temperature-response characteristic substantially corresponding to that of said delay element; and an electrical heater system including a heater element extending through said delay element and said section and including a thermostatic control element in the immediate vicinity of said section and responsive to the temperature of said section for controlling the energization of said heater system.

13. A temperature-controlled magnetostrictive time-delay signal-translating device comprising: an elongated hollow signal-delay element of magnetostrictive material; an input transducer magnetically coupled with a first portion of said delay element and including electrical signal input terminals for an applied electrical signal for converting said signal to a stress wave in said delay element; an output transducer magnetically coupled with a second portion of said delay element and spaced from said first portion and responsive to said stress wave for deriving an output electrical signal delayed relative to said applied signal, said output transducer including means for establishing a polarizing magnetic flux in said second portion; a monitor hollow section positioned in the immediate vicinity of said delay element and having a temperature-response characteristic substantially corresponding to that of said delay element; and an electrical heater system including a heater element extending through said delay element and said section and including a thermostatic control element in the immediate vicinity of said section and responsive to the temperature of said section for controlling the energization of said heater system.

14. A temperature-controlled magnetostrictive time-delay signal-translating device comprising: an elongated hollow signal-delay element of magnetostrictive material; an input transducer magnetically coupled with a first portion of said delay element and including electrical signal input terminals for an applied electrical signal for converting said signal to a stress wave in said delay element; an output transducer magnetically coupled with a second portion of said delay element and spaced from said first portion and responsive to said stress wave for deriving an output electrical signal delayed relative to said applied signal, said output transducer including a permanent magnet for establishing a polarizing magnetic flux in said second portion; a monitor hollow section positioned in the immediate vicinity of said delay element and having a temperature-response characteristic substantially corresponding to that of said delay element; and an electrical heater system including a heater element extending through said delay element and said section and including a thermostatic control element in the immediate vicinity of said section and responsive to the temperature of said section for controlling the energization of said heater system.

15. A temperature-controlled magnetostrictive time-delay signal-translating device comprising: an elongated hollow signal-delay element of magnetostrictive material; an excitation winding magnetically coupled with a first portion of said delay element and including electrical signal input terminals for an applied electrical signal for converting said signal to a stress wave in said delay element; an induction winding magnetically coupled with a second portion of said delay element and spaced from said first portion and responsive to said stress wave for deriving an output electrical signal delayed relative to said applied signal; means for establishing polarizing magnetic fluxes in each of said portions; a monitor hollow section positioned in the immediate vicinity of said delay element and having a temperature-response characteristic substantially corresponding to that of said delay element; and an electrical heater system including a heater element extending through said delay element and said section and including a thermostatic control element in the immediate vicinity of said section and responsive to the temperature of said section for controlling the energization of said heater system.

16. A temperature-controlled time-delay signal-translating device comprising: an elongated hollow signal-delay element of substantially pure nickel; an input means for said element including electrical signal input terminals for an applied electrical signal; an output means for said delay element spaced from said input means for deriving an output signal delayed relative to said applied signal; a monitor hollow section positioned in the immediate vicinity of said delay element and having a temperature-response characteristic substantially corresponding to that of said delay element; and an electrical heater system including an electrically insulated flexible heater element extending through said delay element and said section and including a thermostatic control element in the immediate vicinity of said section and responsive to the temperature of said section for controlling the energization of said heater system.

References Cited in the file of this patent

UNITED STATES PATENTS

| | | |
|---|---|---|
| 1,894,095 | Hall | Jan. 10, 1933 |
| 1,970,295 | Fitzpatrick | Aug. 14, 1934 |
| 2,116,600 | Fisher et al. | May 10, 1938 |
| 2,174,296 | Wallace | Sept. 26, 1939 |
| 2,434,255 | Bond et al. | Jan. 13, 1948 |
| 2,552,139 | Bocciarelli | May 8, 1951 |
| 2,676,305 | Fondiller | Apr. 20, 1954 |